US006429278B1

United States Patent
Howell, Jr. et al.

(10) Patent No.: US 6,429,278 B1
(45) Date of Patent: Aug. 6, 2002

(54) PROCESS FOR MANUFACTURE OF POLYESTERS BASED ON 1,4-CYCLOHEXANEDIMETHANOL AND ISOPHTHALIC ACID

(75) Inventors: Earl Edmondson Howell, Jr.; Donna Rice Quillen, both of Kingsport, TN (US); Aaron Nathaniel Edens, Gate City, VA (US)

(73) Assignee: Eastman Chemical Company, Kingsport, TN (US)

( * ) Notice: Subject to any disclaimer, the term of this patent is extended or adjusted under 35 U.S.C. 154(b) by 4 days.

(21) Appl. No.: 09/767,172

(22) Filed: Jan. 22, 2001

(51) Int. Cl.[7] .............................................. C08G 63/00
(52) U.S. Cl. ....................... 528/307; 528/279; 528/298; 528/300; 528/302; 528/306; 528/308; 528/308.6
(58) Field of Search ................. 528/279, 298, 528/300, 302, 306, 307, 308, 308.6

(56) References Cited

U.S. PATENT DOCUMENTS

| 2,901,466 A | 8/1959 | Kibler et al. |
|---|---|---|
| 3,032,822 A | 5/1962 | Maddock |
| 3,033,826 A | 5/1962 | Kibler et al. |
| 4,196,186 A | 4/1980 | Bogoch |
| 4,521,556 A | 6/1985 | Adams |
| 4,554,343 A | 11/1985 | Jackson et al. |
| 4,578,453 A | 3/1986 | Jackson et al. |
| 4,740,581 A | 4/1988 | Pruett et al. |
| 4,749,772 A | 6/1988 | Weaver et al. |
| 4,749,773 A | 6/1988 | Weaver et al. |
| 4,749,774 A | 6/1988 | Weaver et al. |
| 4,950,732 A | 8/1990 | Weaver et al. |
| 4,959,450 A | 9/1990 | Morris et al. |
| 5,106,941 A | 4/1992 | Jenkins et al. |
| 5,106,944 A | 4/1992 | Sublett |
| 5,194,573 A | 3/1993 | Schmidt et al. |
| 5,198,530 A | 3/1993 | Kyker et al. |
| 5,296,586 A | 3/1994 | Burch et al. |
| 5,340,910 A | 8/1994 | Chamberlin et al. |
| 5,372,864 A | 12/1994 | Weaver et al. |
| 5,376,735 A | 12/1994 | Sublett |
| 5,384,377 A | 1/1995 | Weaver et al. |
| 5,464,590 A | 11/1995 | Yount et al. |
| 5,608,031 A | 3/1997 | Yau et al. |
| 5,681,918 A | 10/1997 | Adams et al. |

FOREIGN PATENT DOCUMENTS

| EP | 0 434 925 A2 | 10/1990 |
|---|---|---|
| EP | 0 826 713 A1 | 3/1998 |
| WO | WO 98/58008 A1 | 12/1998 |

*Primary Examiner*—Samuel A. Acquah
(74) *Attorney, Agent, or Firm*—Cheryl J. Tubach; Bernard J. Graves, Jr.

(57) ABSTRACT

In a process for producing a polyester containing 1,4-cyclohexanedimethanol (CHDM) as one of its glycol components, an aqueous or a methanolic slurry comprising CHDM and a dicarboxylic acid is prepared. The slurry is maintained at a temperature below the melting point of CHDM. The slurry is then fed into a reactor. The slurry is esterified at sufficient temperatures and pressures, and optionally in the presence of a suitable catalyst, to effect esterification. A prepolymer is formed. The prepolymer is then polycondensed at sufficient temperatures and pressures in the presence of a suitable catalyst to effect polycondensation to form a polyester.

35 Claims, 4 Drawing Sheets

PROCESS FOR MANUFACTURE OF POLYESTERS BASED ON 1,4-CYCLOHEXANEDIMETHANOL AND ISOPHTHALIC ACID

TECHNICAL FIELD OF THE INVENTION

This invention relates to processes for the production of polyesters containing 1,4-cyclohexanedimethanol. More particularly, this invention relates to such processes wherein the dicarboxylic acid component of the polyester may be added in its acid form rather than its diester form at ambient conditions.

BACKGROUND OF THE INVENTION

Polyesters are widely used as extrusion and injection molding resins for applications such as fibers, films, sheeting, automotive parts, and food and beverage containers. Polyesters useful for such applications include those containing a glycol component of 1,4-cyclohexanedimethanol (CHDM) and a dicarboxylic acid component such as terephthalic acid and/or isophthalic acid. In manufacturing these polyesters, handling issues arise with respect to supplying these monomers to the reactor since CHDM, terephthalic acid and isophthalic acid are all solid at ambient conditions. The handling of these monomers is of significant concern for continuous processes in which bulk handling and precise metering of solids is extremely difficult.

CHDM, which is a waxy solid at ambient conditions, is typically heated to above its melting point to facilitate a molten transfer of the CHDM to the reactor. However, maintaining CHDM at temperatures above its melting point for long periods of time is not desirable because of increased rates of degradation and the increased energy costs of maintaining a heated feed.

The dicarboxylic acids are typically supplied as a fluid in the form of their lower alkyl ester, such as dimethyl terephthalate or dimethyl isophthalate. The use of the lower alkyl esters of these acids in the polymer manufacturing process developed because of early difficlties in purifying terephthalic and isophthalic acids. However, technology for purification has evolved. Now purified dicarboxylic acids are commonly available for use in the polyester manufacturing process. Because of handling rather than purity, the dicarboxylic acids are often times converted to their ester derivatives prior to being supplied to the reactor. The esters can be melted to form a liquid and thus more precisely metered to the reaction process. This conversion requires additional processes steps resulting in unnecessary costs.

When the dicarboxylic acid, rather than its ester derivative, is used to supply the acid moiety of the polyester, a blend of glycol and dicarboxylic acid in the form of a paste has been used to introduce these raw materials to a batch reactor or the first stage reactor in a continuous process. This process is reasonably effective when the major glycol component is ethylene glycol, which is a liquid at ambient conditions. However, problems frequently arise in feeding such pastes to a reactor when glycols that are solids at ambient conditions, such as neopentyl glycol or CHDM, are used. The glycol and dicarboxylic acid must be heated to sufficient temperature to form a molten paste. Many dicarboxylic acids, especially terephthalic acid and isophthalic acid, degrade upon heating with increasing degradation as temperatures approach the melt temperatures of the dicarboxylic acids. In some cases a mixture of the purified dicarboxylic acid and a dimethyl ester of the same or a different dicarboxylic acid is supplied to the reactor. However, this process does not eliminate the cost of obtaining the ester derivative.

Thus, there exists a need in the art for a process to supply glycols and dicarboxylic acids that are solids at room temperature to a reactor without degradation of the glycols or dicarboxylic acids. Accordingly, it is to the provision of such processes that the present invention is primarily directed.

BRIEF SUMMARY OF THE INVENTION

In a process for producing a polyester containing 1,4-cyclohexanedimethanol (CHDM) as one of its glycol components, an aqueous or a methanolic slurry comprising CHDM and a dicarboxylic acid is prepared. The slurry is maintained at a temperature below the melting point of CHDM. The slurry is then fed into a reactor. The slurry is esterified at sufficient temperatures and pressures, and optionally in the presence of a suitable catalyst, to effect esterification. A prepolymer is formed. The prepolymer is then polycondensed at sufficient temperatures and pressures in the presence of a suitable catalyst to effect polycondensation to form a polyester.

DETAILED DESCRIPTION

Figure 1:
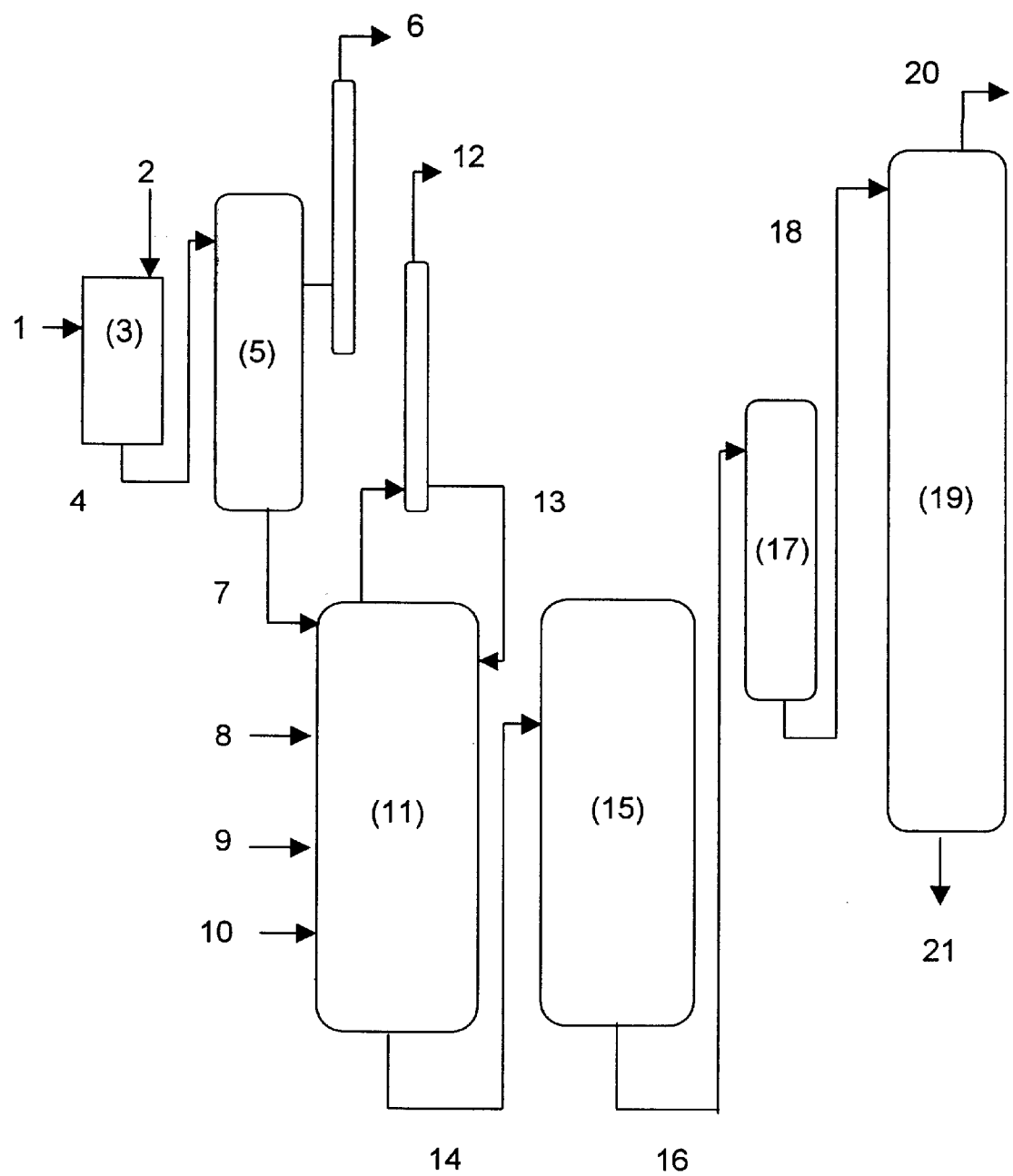
FIG. 1 is a flow diagram illustrating a preferred embodiment of the present invention.

In the preparation of polyesters containing a glycol component of CHDM and dicarboxylic acid components such as terephthalic acid and isophthalic acid, feeding difficulties are encountered in trying to introduce the dicarboxylic acid and CHDM into an esterification reactor. By the addition of a small amount of water or methanol to a mixture of CHDM and the dicarboxylic acid, a low viscosity, low temperature slurry is formed which unexpectedly resolves the difficulties of prior processes. The viscosity of the slurry is sufficiently low to provide a free-flowing material, thus making the slurry easy to handle and feed to the reactor. The slurry is maintained at temperatures below the melting point of CHDM, thus degradation of the glycol is minimized.

The present invention provides a process for producing a polyester comprising the steps of a) preparing an aqueous or a methanolic slurry comprising CHDM and a dicarboxylic acid, the slurry being maintained at a temperature below the melting point of CHDM;

b) feeding the slurry into a reactor;

c) esterifying the slurry at sufficient temperatures and pressures, and optionally in the presence of a suitable catalyst, to effect esterification;

d) forming a prepolymer; and e) polycondensing the prepolymer at sufficient temperatures and pressures in the presence of a suitable catalyst to effect polycondensation to form a polyester.

In step a), the slurry is prepared by combining CHDM, a dicarboxylic acid, and either water or methanol. Preferably, the amount of water or methanol added to the CHDM and dicarboxylic acid is sufficient to form a free-flowing material. The amount of water or methanol present in the slurry is preferably in the range of about 2 to about 15 weight percent and more preferably from about 2 to about 6 weight percent. At this weight percent of water or methanol, settling of the dicarboxylic acid from the slurry is minimized thus reducing the need for continuous agitation of the slurry. Preferably, the slurry is maintained from below 55° C. to ambient conditions. More preferably, the slurry is maintained at ambient conditions. The term "ambient conditions" as used herein means the natural condition of the slurry during operation of the process of the present invention without additional heat or pressure.

CHDM may be in the cis-, trans- or as a cis/trans mixture of isomers. In addition to the CHDM moiety, other glycols may also be used in the process to modify the polyester composition. Preferably, the other glycols are added after step a), thus not being a component of the slurry. Other glycols which may be used include those having from 2 to about 12 carbon atoms such as ethylene glycol; propylene glycol; 1,3-propanediol; 1,4-butanediol; 1,5-pentanediol; 1,6-hexanediol; neopentyl glycol; diethylene glycol; 1,8-octanediol; and 2,2,4,4-tetramethyl-1,3-cyclobutanediol.

While any dicarboxylic acid that has a tendency to degrade with increasing temperature may be used in the present invention, the slurry is preferably prepared with a dicarboxylic acid having a melting point greater than 300° C. More preferably, these dicarboxylic acids are selected from the group consisting of isophthalic acid (IPA), terephthalic acid (TPA), naphthalenedicarboxylic acid (NDA), 1,4-cyclohexanedicarboxylic acid (CHDA), and 5-sodiosulfoisophthalic acid (SSIPA). Most preferably, the dicarboxylic acid in the slurry is IPA or TPA. CHDA may be in the cis-, trans- or as a cis/trans mixture of isomers. Any of the NDA isomers may be used, but the 1,4-, 1,5-, 2,6-, and 2,7- isomers are preferred. The dicarboxylic acid of the slurry may also be a dicarboxylic acid having a melting point greater than 90° C. and up to 300° C. Preferably, these dicarboxylic acids are selected from the group consisting of adipic acid, azelaic acid, glutaric acid, maleic acid, malonic acid, oxalic acid, sebacic acid, succinic acid and sulfoisophthalic acid. The slurry may also be prepared with at least one additional dicarboxylic acid. Any combination of the above mentioned dicarboxylic acids may be used. Preferably, this combination of two or more dicarboxylic acids is selected from the group consisting of IPA, TPA, NDA, CHDA, SSIPA, and adipic acid. Most preferably, the dicarboxylic acid combination in the slurry is IPA and TPA.

The molar ratio in the slurry of CHDM to the dicarboxylic acid is preferably from about 0.5:1 to about 3:1. More preferably, the molar ratio is from about 1:1 to about 2:1.

In step b), the slurry is fed to the reactor. The slurry is prepared and maintained in a separate container from the reactor. The temperature of the slurry, as well as its physical separation from the reactor, prevents any significant esterification reaction between the CHDM and dicarboxylic acid.

In step c), the slurry is esterified at sufficient temperatures and pressures, and optionally in the presence of a suitable catalyst, to effect esterification. The esterification step is preferably conducted at a temperature of from about 165 to about 300° C. and at a pressure of atmospheric to about 60 psig (5.25 km/cm$^2$). A sufficient amount of water, which is used to prepare the aqueous slurry and is also formed by the esterification reaction, is typically removed during the process prior to the polycondensing step. If a methanolic slurry is used, both water formed by the esterification reaction and methanol are removed. When and how much water or water and methanol are removed is based on overall process conditions and readily determined by one skilled in the art.

The polyesters produced by the process of the present invention may be modified with at least one additional dicarboxylic acid other than those that are components of the slurry. The at least one additional dicarboxylic acid that is not a component of the slurry (hereinafter "non-slurry dicarboxylic acid") is added to the process during esterification of step c). The non-slurry dicarboxylic acid is mixed with a glycol that is a liquid at ambient conditions or stable at elevated temperatures and then added to the process. Preferably, the glycol is ethylene glycol. These non-slurry dicarboxylic acids may be any of the dicarboxylic acids preferred for use in the slurry and other dicarboxylic acids containing from about 4 to about 40 carbon atoms such as succinic acid, sebacic acid, suberic acid, 1,10-decanedioic dimer, 1,12-dodecanedioic dimer, 1,4-cyclohexanediacetic acid, diphenyl-4,4'-dicarboxylic acid, and sulfodibenzoic acid.

A prepolymer is formed in step d). This prepolymer may be the reaction product of step c) or it may be the reaction product of step f) described below when step f occurs after step c).

In step e), the process is concluded by polycondensing the prepolymer at sufficient temperatures and pressures in the presence of a suitable catalyst to effect polycondensation to form a polyester. Polycondensation may be conducted by melt phase techniques or by solid state techniques, both well known in the art to provide high molecular weight polyesters. Melt phase processes are typically conducted at temperatures of about 260 to about 320° C. and under a vacuum of about 0.5 to about 1.0 mm Hg to aid in the removal of reaction byproducts and excess glycol. For solid state processes, the reaction product of step c), a low-molecular prepolymer, is isolated, solidified and granulated. The solid prepolymer is then heated at a temperature about 20 to 40° C. below its melting point under a vacuum or in the presence of a flow of nitrogen.

The polycondensation catalysts may be titanium, tin, antimony, lithium, aluminum, germanium, lead, arsenic, and mixtures thereof. Typically, the polycondensation catalyst is present in the range of 1 to 500 ppm. Titanium is the preferred catalyst. The amount of titanium used based on final polymer weight is generally in the range of about 5 to about 150 ppm. Preferably, the amount of titanium is about 10 to about 90 ppm Ti, and more preferably about 20 to about 80 ppm. Suitable titanium compounds include acetyltriisopropyltitanate, tetraisopropyltitanate, and tetraisobutyltitanate. When titanium is the catalyst and ethylene glycol is used as a comonomer with CHDM in the process, then a phosphorus compound inhibitor may optionally be used.

In another embodiment of the present invention, the process further comprises the step of:

f) prior to step (e), transesterifying with an ester derivative of a second dicarboxylic acid at sufficient temperatures and pressures in the presence of a suitable catalyst to effect transesterification. The ester derivative of the second diacid may be selected from the dialkyl esters of any of the dicarboxylic acids mentioned above, such as dimethyl terephthalate or dimethyl isophthalate. Transesterifying of step f) occurs either before step c), during step c), or after step c), providing much flexibility to the process. If transesterification occurs after step c), as much water as possible should be removed prior to transestification. Excess water negatively impacts catalyst performance and creates a waste stream of a mixed condensate of water and methanol. The methanol is present because of its use in preparing the slurry or as a by-product of transesterification. Ester interchange is typically carried out at temperatures ranging from 180 to 220° C. The transesterification catalyst is preferably titanium present from about 5 to 150 ppm. Other useful transesterification catalyst include lithium, manganese, magnesium, calcium, cobalt, zinc, sodium, rubidium, cesium, strontium, chromium, barium, nickel, cadmium, iron and tin. Also mixtures of catalyst metals may be used if desired. Normal concentrations of catalyst are in the range of 1 to 500 ppm.

The process from step a) through step e), and optionally through step f), is preferably continuous.

Figure 2:
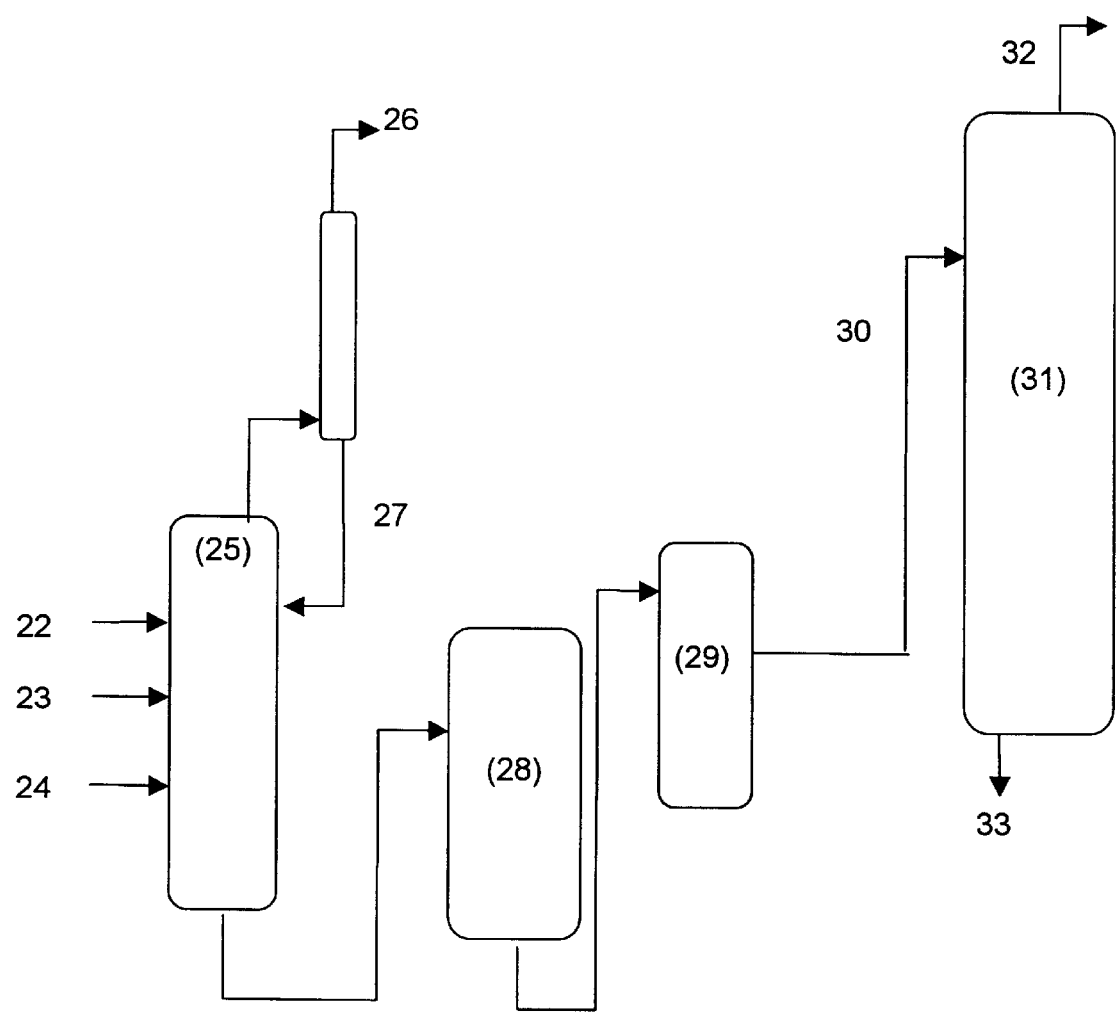
FIG. 2 is a flow diagram illustrating another preferred embodiment of the present invention.
Figure 3:
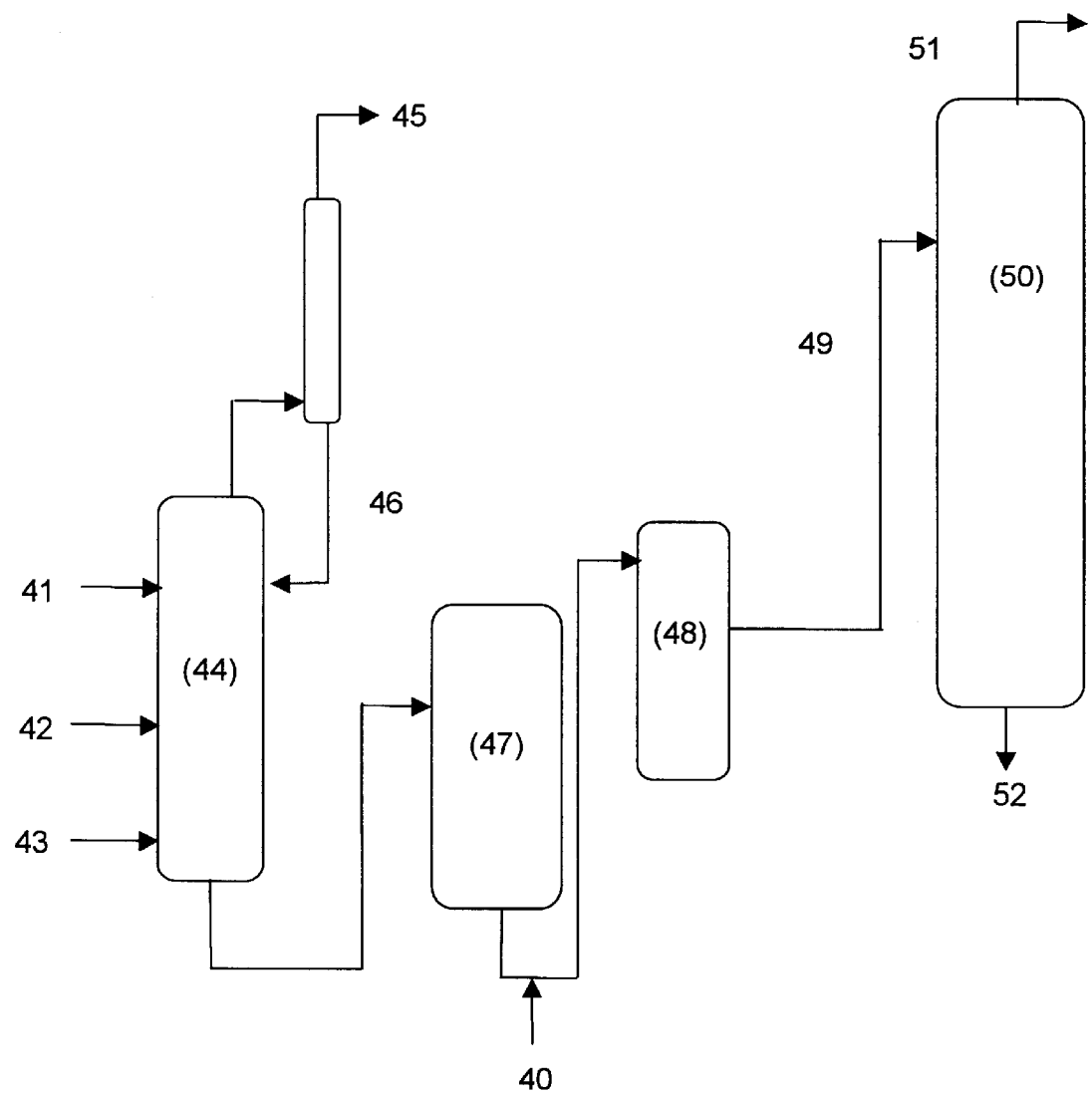
FIG. 3 is a flow diagram illustrating still another preferred embodiment of the present invention.

With reference to the FIGS. 1 to 3, typical process flow diagrams are shown for the process of the present invention which include steps a) through f). In FIG. 1, isophthalic acid 1 and a CHDM/water mixture 2 are fed to a slurry tank 3. The slurry 4 is fed to an esterification reactor 5, which is operated at about 240° C. The molar ratio of CHDM to isophthalic acid in the slurry is generally about 2 to 1. Water 6 is removed from the esterification reactor 5 to provide an esterification reaction product 7. This esterification reaction product 7, as well as dimethyl terephthalate (DMT) 8, titanium catalyst 9 and CHDM 10 are fed to a first ester exchange reactor 11 for transesterification. The first ester exchange reactor 11 is maintained at a temperature in the range of about 245 to about 290° C. and a pressure of about 15 (2.08 km/cm$^2$) to about 60 psig (5.25 km/cm$^2$). A methanol/water by-product 12 is removed by distillation with recovered CHDM 13 being returned to the reactor 11. A transesterification reaction product 14 exits the first ester exchange reactor 11 and continues through a second ester exchange reactor 15 operated at about 285° C. and about 30 psig (2.63 kg/cm$^2$). A second transesterification reaction product 16 exits the second ester exchange reactor 15 and is fed to a prepolymer reactor 17. The prepolymer reactor 17 is operated at about 285° C. and atmospheric pressure. A prepolymer 18 exits the prepolymer reactor 17 and enters a polymerization reactor 19 for polycondensation. The polymerization reactor 19 is operated at about 285° C. and a pressure in the range of about 5 to about 15 mm Hg in the top polymerization section and at a pressure of about 0.5 to about 1.5 mm Hg in the bottom section. The polymerization reactor 19 is a sloped tray reactor design, which is described in U.S. Pat. Nos. 4,196,186 and 5,464,590 assigned to Eastman Kodak Company. Instead of the sloped tray reactor, other polymerization reactors such as a Zimmer disc/ring reactor or a Karl Fischer horizontal cage reactor may be used. Reaction by-products 20 and polyester 21 exit the polymerization reactor 19.

Another useful embodiment of the process of the present invention is shown in FIG. 2. In this operating procedure, dimethyl terephthalate 22, titanium catalyst 23 and the aqueous slurry 24 of CHDM and isophthalic acid are added to a reactor 25 for simultaneous esterification and transesterification. A methanol/water by-product 26 is removed by distillation with recovered CHDM 27 being returned to the reactor 25. Additional reactors 28, 29 are used in sequence for further reaction. A prepolymer 30 is fed to the polymerization reactor 31 for polycondensation. Reaction by-products 32 and polyester 33 exit the polymerization reactor 31.

As shown in FIG. 3, the process may be operated with a later addition of the aqueous slurry 40 of CHDM and isophthalic acid. Dimethyl terephthalate 41, titanium 42 and CHDM 43 are added to a reactor 44. A methanol/water by-product 45 is removed by distillation with recovered CHDM 46 being returned to the reactor 44. The aqueous slurry 40 is introduced between downstream reactors 47, 48. A Prepolymer 49 is fed to the Polymerization reactor 50 for Polycondensation. Reaction by-products 51 and polyester 52 exit the polymerization reactor 50.

The Polyester prepared by the process of the present invention preferably has an inherent viscosity of about 0.4 to about 2.0 dL/g, more preferably 0.6 to 1.2 dL/g. Inherent viscosity (I.V.) is measured at 25° C. using 0.50 grams of polymer per 100 ml of a solvent consisting of 60% by weight phenol and 40% by weight tetrachloroethane. Preferably, the polyester composition comprises a glycol component comprising residues of up to 100 mole percent CHDM, preferably about 60 to 100 mole percent, and a diacid component comprising residues of about up to 100 mole % isophthalic acid, terephthalic acid, naphthalenedicarboxylic acid, 1,4-cyclohexanedicarboxylic acid, 5-sodiosulfoisophthalic acid, adipic acid or mixtures thereof. In addition, other modifying dicarboxylic acids may be included in the compositions if desired. Such dicarboxylic acids include those containing from about 4 to about 40 carbon atoms such as succinic, glutaric, adipic, sebacic, suberic, 1,10-decanedioic, 1,12-dodecanedioic, dimer, sulfoisophthalic, 1,4-cyclohexanediacetic, diphenyl-4,4'-dicarboxylic, sulfodibenzoic and the like acids. In addition to the CHDM moiety, other glycols which may be used include those having from 2 to about 12 carbon atoms such as ethylene glycol, Propylene glycol, 1,3-propanediol, 1,4-butanediol, 1,5-pentanediol, 1,6-hexanediol, neopentyl glycol, diethylene glycol, 1,8-octanediol, 2,2,4,4-tetramethyl-1,3-cyclobutanediol and the like.

Small amounts, typically less than 2 mole %, of branching agents may be used if desired. Conventional branching agents include polyfunctional acids, anhydrides, alcohols and mixtures thereof. Examples of suitable branching agents include, but are not limited to, trimellitic anhydride, pyromellitic dianhydride, glycerol, trimethylolpropane and pentaerythritol. Small amounts of a branching agent are useful in increasing the melt strength and melt viscosity of the polymers.

In forming the polyesters of the invention, colorants may be added to impart a neutral hue and/or brightness to the resulting polyester. When colored polyesters are desired, pigments, whiteners or colorants may be included in the reaction mixture during the reaction of the glycol and dicarboxylic acid components or they may be melt blended with the preformed polyester. A preferred method of including colorants is to use a colorant containing thermally stable organic colored compounds, which have reactive groups such that the colorant is copolymerized and incorporated into the polyester. For example, dyes containing reactive hydroxyl and/or carboxyl groups, such as blue and red substituted anthraquinones, may be copolymerized into the polymer chain. Colorants are described in detail in U.S. Pat. Nos. 4,521,556; 4,740,581; 4,749,772; 4,749,773; 4,749,774; 4,950,732; 5,384,377; 5,372,864; 5,340,910; 5,608,031 and 5,681,918, herein incorporated by reference in their entirety. Alternatively, inorganic pigments, such as titanium dioxide and cobalt containing materials, may be added to the reaction mixture. Advantageously, when a catalyst material contains cobalt, the cobalt may also act as a colorant or toner. Care must be taken to control the amount of cobalt used in order to avoid opacity or a dingy appearance in the polyesters of the invention. To control the level of opacity or dinginess, cobalt concentrations of less than about 90 ppm are used.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

This example demonstrates the preparation of an aqueous slurry of CHDM/isophthalic acid and the use of the aqueous slurry in the process of the present invention to prepare a polyester with a composition of 65 mole % terephthalic acid, 35 mole % isophthalic acid, and 100 mole % CHDM, based on 200 mole %.

441.3 grams (3.06 mol) of 1,4-cyclohexanedimethanol (CHDM), 254.4 grams (1.53 mol) of purified isophthalic acid (IPA) and 44.4 grams (2.47 mol) of water are mixed together at room temperature to produce a stable, free-flowing slurry. The slurry is added to a 1000-ml round-bottom flask, which is fitted with a paddle stirrer and a distillation head for removal of reaction byproducts (water). The flask's contents are stirred and heated to a maximum reaction temperature of 260° C. using a resistance heating mantel. The heat-up from room temperature is carried out as rapidly as possible. During the heat-up, the 44.4 grams of water that were added initially are distilled out. The remaining reaction mixture is stirred for approximately 1.5 hours more or until the theoretical amount of water, 55.1 grams (3.06 mol) has been collected.

64.5 grams of the product mixture described above is added to a second 500-ml round-bottom flask containing 55.22 grams (0.285 mol) of dimethyl terephthalate (DMT), 20.86 grams (0.145 mol) of CHDM, and 0.050 grams of acetyltriisopropyltitanate (70 ppm Ti based on polymer produced). This mixture produces a final CHDM to aromatics (DMT and IPA) molar ratio of 1.03:1, which is within the desired 1:1 to 2:1 ratio range. Toning agents, such as cobalt and/or dyes, especially anthraquinone moieties, are added at levels that are sufficient to produce a neutral (colorless) product polymer. The reaction flask is fitted with a stainless steel stirrer and an adapter that allows reaction vapors to escape and be collected in a cold trap/vacuum pump system. The reaction flask is then immersed into a molten metal bath preheated to 235° C. Vigorous stirring is initiated (150 rpm) and the system is maintained at atmospheric pressure. During this heating period, methanol is evolved from the reacting mixture and recovered by condensation. After 37 minutes at 235° C., the temperature is ramped at 2° C./min to 285° C. When the temperature setpoint is achieved, the pressure in the flask is reduced to 0.5 mm Hg over a period of ten minutes. During the ten minute pressure ramp, the stirring rate is reduced to 100 rpm. Vacuum level, stirring rate and temperature are maintained for 35 to 45 minutes to produce a polymer having an inherent viscosity in the range of 0.75 to 1.0 dL/g (60/40 phenol- tetrachloroethane at 25° C.).

Example 2

This example demonstrates the preparation of a polyester by the process of the present invention, the polyester having a composition of 83 mole % terephthalic acid, 17 mole % isophthalic acid, and 100 mole % CHDM, based on 200 mole %.

24.57 grams of the aqueous slurry of Example 1 is added to a second 500-ml round-bottom flask containing 55.22 grams (0.285 mol) of DMT, 34.126 grams (0.237 mol) of CHDM, and 0.039 grams of acetyltriisopropyltitanate (70 ppm Ti based on polymer produced). This mixture produces a final CHDM to aromatics (DMT and IPA) molar ratio of 1.03:1. Toning agents, such as cobalt and/or dyes, especially anthraquinone moieties, are added at levels that are sufficient to produce a neutral (colorless) product polymer. The reaction flask is fitted with a stainless steel stirrer and an adapter that allows reaction vapors to escape and be collected in a cold trap/vacuum pump system. The reaction flask is then immersed into a molten metal bath preheated to 235° C. Vigorous stirring is initiated (150 rpm), and the system is maintained at atmospheric pressure. During this heating period, methanol is evolved from the reacting mixture and recovered by condensation. After 37 minutes at 235° C., the temperature is ramped at 2° C./min to 285° C. When the temperature setpoint is achieved, the pressure in the flask is reduced to 0.5 mm Hg over a period of ten minutes. During the ten minute pressure ramp, the stirring rate is reduced to 100 rpm. Vacuum level, stirring rate and temperature are maintained for 35 to 45 minutes to produce a polymer having an inherent viscosity in the range of 0.75 to 1.0 dL/g (60/40 phenol-tetrachloroethane at 25° C).

Example 3

This example demonstrates the preparation of a polyester by the process of the present invention, the polyester having a composition of 95 mole % terephthalic acid, 5 mole % isophthalic acid, and 100 mole % CHDM, based on 200 mole %.

6.31 grams of the aqueous slurry of Example 1 is added to a second 500-ml round-bottom flask containing 55.22 grams (0.285 mol) of DMT, 40.23 grams (0.279 mol) of CHDM, and 0.034 grams of acetyltriisopropyltitanate (70 ppm Ti based on polymer produced). This mixture produces a final CHDM to aromatics (DMT and IPA) molar ratio of 1.03:1. Toning agents, such as cobalt and/or dyes, especially anthraquinone moieties, are added at levels that are sufficient to produce a neutral (colorless) product polymer. The reaction flask is fitted with a stainless steel stirrer and an adapter that allows reaction vapors to escape and be collected in a cold trap/vacuum pump system. The reaction flask is then immersed into a molten metal bath preheated to 235° C. Vigorous stirring is initiated (150 rpm), and the system is maintained at atmospheric pressure. During this heating period, methanol is evolved from the reacting mixture and recovered by condensation. After 37 minutes at 235° C., the temperature is ramped at 2° C./min to 285° C. When the temperature setpoint is achieved, the pressure in the flask is reduced to 0.5 mm Hg over a period of ten minutes. During the ten-minute pressure ramp, the stirring rate is reduced to 100 rpm. Vacuum level, stirring rate and temperature are maintained for 35 to 45 minutes to produce a polymer having an inherent viscosity in the range of 0.75 to 1.0 dug (60/40 phenol- tetrachloroethane at 25° C.).

Similarly good results are achieved when dimethyl-2, 6-naphthalenedicarboxylate are included in the reaction mixture to produce a polyester containing 5 mole % isophthalic acid, 15 mole % 2,6-naphthalenedicarboxylic acid, 80 mole % terephthalic acid, and 100 mole % CHDM. This polyester has an inherent viscosity in the range of 0.65 to 0.80 dL/g (60/40 phenol-tetrachloroethane at 25° C.).

Example 5

This example demonstrates a continuous process for the preparation of a polyester by the process of the present invention, the polyester having a composition of 65 mole % terephthalic acid, 35 mole % isophthalic acid, and 100 mole % CHDM, based on 200 mole %.

An aqueous slurry is prepared by combining a mixture of 288 parts of CHDM, 29 parts of water and 166 parts of purified isophthalic acid in powder form. The slurry is fed to an esterification reactor 5, as shown in FIG. 1, and reacted at a temperature of 240° C. A total of 420 parts of an esterification reaction product 7 is then fed to a first ester exchange reactor 11 along with 361 parts of dimethyl terephthalate 8, 135 parts of CHDM 10 and 0.4 parts of acetyltriisopropyltitanate catalyst 9 (70 ppm Ti based on polymer weight). The overall mole ratio of CHDM to the dicarboxylic acid moieties is kept in the range of 1.1 to 1 and is adjusted by controlling the CHDM feed rate to the first ester exchange reactor 11. Red and blue anthraquinone toner dyes are added at levels of less than 10 ppm to control the polymer a* and b* color to a desired level. The first ester exchange reactor 11 is operated at 285° C. and 45 psig (4.2 kg/cm$^2$). A transesterification reaction product 14 exits the first ester exchange reactor 11 and continues through a second ester exchange reactor 15 operated at 285° C. and 30 psig (3.04 kg/cm$^2$) before entering the prepolymer reactor 17. The prepolymer reactor 17 is operated at 285° C. and atmospheric pressure. After exiting the prepolymer reactor 17, the prepolymer 18 enters a polymerization reactor 19 which is operated at 285° C. and 5 mm Hg pressure in the top polymerization section and at 1.5 mm Hg pressure in the bottom section. The molten polyester 21 is removed from the bottom of the polymerization reactor 19, stranded under water and chopped into ⅛ in. pellets. These pellets have excellent color and have an IV of 0.74 dL/g.

Examples 6 to 16

This example demonstrates the effect of mole ratio, temperature and percent water on slurry viscosity.

A statistically designed experiment is carried out to examine the effect of percent water, mole ratio and temperature on the viscosity of a slurry of CHDM and isophthalic acid. In Example 6, a slurry is prepared by mixing 103 grams of purified isophthalic acid, 179 grams CHDM and 18.1 grams water. The slurry is heated with stirring to a temperature of 42° C. over one hour. The viscosity of the slurry is measured at 42° C. using a Brookfield Model LVT viscometer equipped with a T-bar spindle. Examples 7 to 16 are repeated in the same manner as Example 1, except using the conditions specified in Table 1. In the experimental design, the mole ratio is varied from 1.0 to 3.0, the temperature is varied from 25 to 60° C., and the water is varied from 0 to 12 percent.

From the data of Table 1, a non-linear response model can be developed to describe the effect of mole ratio, percent water and temperature on slurry viscosity. Using this equation, it can be demonstrated that the most effective and preferred method for decreasing the slurry viscosity is through the addition of water. Using the equation, the relative effects of mole ratio, temperature and percent water on the slurry viscosity can be compared. For example, at a mole ratio of 1.5, 6.0 weight percent water and 35° C., the equation predicts a slurry viscosity of 2300 centipoise. Increasing the weight percent water to seven has the effect of lowering the viscosity to 2000 centipoise. To lower the slurry viscosity by the same amount as increasing the water by one percent would require an increase in temperature from 35 to 64° C. or an increase in the mole ratio from 1.5 to 1.8. This example illustrates that the preferred method for decreasing the viscosity of the slurry is the addition of water to the slurry. Increasing the temperature to lower the slurry viscosity is not desired due to increased energy costs and degradation of CHDM. Increasing the mole ratio to decrease the slurry viscosity is not desired because increasing the mole ratio negatively impacts the subsequent polycondensation rate. Large excesses of CHDM to the dicarboxylic acid are generally not used because of the difficulty of removing CHDM, a high-boiling glycol, later in the polycondensation stage, which limits the degree of polymerization that can be obtained.

Examples 12 and 16 illustrate the fact that the CHDM:IPA slurry solifies at ambient temperature in the absence of water. Since the 70% trans/30% cis-CHDM mixture solidifies at about 63° C., the slurry would need to be heated to this temperature in order to keep it molten. However, the addition of water keeps the slurry from solidification so that lower temperatures can be used.

TABLE 1

| | Charges | | | mole ratio | weight | | |
|---|---|---|---|---|---|---|---|
| Ex. | IPA (g) | CHDM (g) | water (g) | (CHDM to IPA) | percent water | temp. (° C.) | viscosity (cp) |
| 6 | 103.1 | 178.9 | 18.0 | 2.0 | 6.0 | 42 | 680 |
| 7 | 160.6 | 139.4 | 0 | 1.0 | 0 | 60 | 4997 |
| 8 | 103.1 | 178.9 | 18.0 | 2.0 | 6.0 | 42 | 579 |
| 9 | 73.3 | 190.7 | 36.0 | 3.0 | 12.0 | 60 | 74 |
| 10 | 141.3 | 122.7 | 36.0 | 1.0 | 12.0 | 25 | 608 |
| 11 | 73.3 | 190.7 | 36.0 | 3.0 | 12.0 | 25 | 417 |
| 12 | 160.6 | 139.4 | 0 | 1.0 | 0 | 25 | no data[1] |
| 13 | 141.3 | 122.7 | 36.0 | 1.0 | 12.0 | 60 | 190 |
| 14 | 103.1 | 178.9 | 18.0 | 2.0 | 6.0 | 42 | 656 |
| 15 | 83.3 | 216.8 | 0 | 3.0 | 0 | 60 | 855 |
| 16 | 83.3 | 216.8 | 0 | 3.0 | 0 | 25 | no data[1] |

[1]Slurry solidified at 25° C.

Examples 17 to 19

This example demonstrates the effect of weight percent water on slurry settling rates.

Settling of isophthalic acid from the CHMD/water matrix is undesirble because problems in feeding a slurry of consistent composition may occur. Examples 17 to 20 are carried out to examine the effect of weight percent water on the rate of settling of isophthalic acid from a mixture of CHDM and water. In example 17, a 2:1 CHDM:IPA mole ratio slurry containing 2 weight percent water is prepared by mixing 107 grams of IPA, 187 g of CHDM and 6 grams of water. The slurry is heated to 42° C. with stirring over a one-hour period. The slurry viscosity is measured using the same technique as described in Examples 6 to 16. The slurry is then allowed to stand undisturbed at 42° C., and periodically the viscosity is measured again, taking care not to mix or disturb the slurry. As the isophthalic acid settles from the mixture over time, the viscosity decreases. The viscosity of a mixture of CHDM (187 g) and water (6 g) is measured at 42° C., which represents the baseline viscosity of the slurry in which the IPA solid has completely settled. Comparing the viscosity of the mixture as it settles to the baseline viscosity of the CHDM/water mixture, gives a measure of the rate of settling of isophthalic acid from the slurry. The percent settled from the slurry is calculated by the following equation:

$$\% \text{ settled} = \frac{(\text{starting } \mu - \text{baseline } \mu) - (\text{settled } \mu - \text{baseline } \mu)}{\text{starting } \mu - \text{baseline } \mu} * 100$$

wherein baseline $\mu$ is the viscosity of the CHDM/water mixture without isophthalic acid; starting $\mu$, is the viscosity of the isophthalic acid/CHDM/water slurry before settling; and settled $\mu$ is the viscosity of the isophthalic/CHDM/water slurry after settling.

Figure 4:
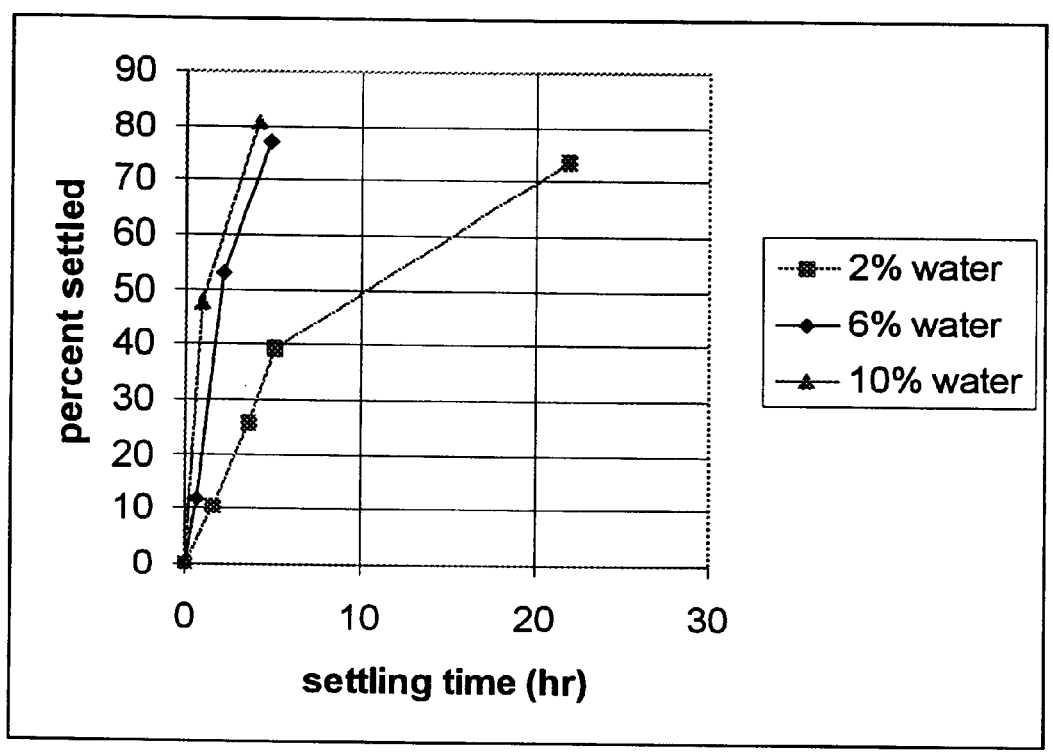
FIG. 4 is a graph of slurry settling rates as a function of percent water.

In example 18, the settling rate is measured using the process described above except that 6 weight percent water is added to the slurry. In Example 19, 10 percent water is added to the slurry. The results of the settling experiments are given in Table 2 and plotted in FIG. 4. They indicate that settling of isophthalic acid is much more rapid in the slurries containing 6 and 10 weight percent water than the one containing 2 weight percent water. For this reason, water levels between about 2 to about 6 weight percent are preferred.

TABLE 2

Slurry Settling Rates as a Function of Weight Percent Water

Example 17
CHDM:IPA Mole ratio: 2.0
Percent water added: 2.0
Temperature: 42° C.
Baseline $\mu$: 816 centipoise

| settling time (h) | viscosity (centipoise) | % settled |
|---|---|---|
| 0 | 3062 | 0 |
| 1.58 | 2821 | 10.7 |
| 3.58 | 2480 | 25.9 |
| 5.08 | 2178 | 39.6 |
| 21.83 | 1406 | 73.7 |

Example 18
CHDM:IPA Mole ratio: 2.0
Percent water added: 6.0
Temperature: 42° C.
Baseline $\mu$: 262 centipoise

| settling time (h) | viscosity (centipoise) | % settled |
|---|---|---|
| 0 | 680 | 0 |
| 0.67 | 631 | 11.7 |
| 2.17 | 459 | 52.3 |
| 4.83 | 359 | 76.8 |

Example 19
CHDM:IPA Mole ratio: 2.0
Percent water added: 10.0
Temperature: 42° C.
Baseline $\mu$: 126 centipoise

| settling time (h) | viscosity (centipoise) | % settled |
|---|---|---|
| 0 | 260 | 0 |
| 0.92 | 196 | 47.7 |
| 4.17 | 152 | 80.6 |

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A process for producing a polyester comprising the steps of:
   a) preparing an aqueous or a methanolic slurry comprising CHDM and a dicarboxylic acid, the slurry being maintained at a temperature below the melting point of CHDM;
   b) feeding the slurry into a reactor;
   c) esterifying the slurry at sufficient temperatures and pressured and optionally in the presence of a suitable catalyst, to effect esterification;
   d) forming a prepolymer, and
   e) polycondensing the prepolymer at sufficient temperatures and pressures in the presence of a suitable catalyst to effect polycondensation to form a polyester.

2. The process of claim 1 wherein step a), the slurry is prepared with about 2 to about 15 weight percent water.

3. The process of claim 2 wherein step a), the slurry is prepared with about 2 to about 6 weight percent water.

4. The process of claim 1 wherein step a), the slurry is maintained from below 55° C. to ambient conditions.

5. The process of claim 1 wherein step a), the slurry is maintained at ambient conditions.

6. The process of claim 1 wherein step a), the slurry is prepared with the dicarboxylic acid having a melting point greater than 300° C.

7. The process of claim 6 wherein the dicarboxylic acid is selected from the group consisting of isophthalic acid, terephthalic acid, naphthalenedicarboxylic acid, 1,4-cyclohexanedicarboxylic acid, and 5-sodiosulfoisophthalic acid.

8. The process of claim 1 wherein step a), the slurry is prepared with the dicarboxylic acid being isophthalic acid.

9. The process of claim 1 wherein step a), the slurry is prepared with the dicarboxylic acid being terephthalic acid.

10. The process of claim 1 wherein step a), the slurry is prepared with the dicarboxylic acid having a melting point greater than 90° C. and up to 300° C.

11. The process of claim 10 wherein the dicarboxylic acid is selected from the group consisting of adipic acid, azelaic acid, glutaric acid, maleic acid, malonic acid, oxalic acid, sebacic acid, succinic acid and sulfoisophthalic acid.

12. The process of claim 1 wherein step a), the slurry is prepared with at least one additional dicarboxylic acid.

13. The process of claim 12 wherein step a), the dicarboxylic acid and the at least one additional dicarboxylic acid are selected from the group consisting of isophthalic acid, terephthalic acid, naphthalenedicarboxylic acid, 1,4-cyclohexanedicarboxylic acid, 5-sodiosulfoisophthalic acid, adipic acid, and mixtures thereof.

14. The process of claim 12 wherein step a), the dicarboxylic acids are isophthalic acid and terephthalic acid.

15. The process of claim 1 wherein step a), the slurry is prepared with a molar ratio of CHDM to the dicarboxylic acid of about 0.5:1 to about 3:1.

16. The process of claim 15 wherein step a), the slurry is prepared with a molar ratio of CHDM to the dicarboxylic acid of about 1:1 to about 2:1.

17. The process of claim 1 wherein step (c), the slurry is esterified with at least one additional dicarboxylic acid.

18. The process of claim 1 wherein step (c), the slurry is esterified with a mixture of at least one additional dicarboxylic acid and ethylene glycol.

19. The process of claim 1 wherein step (c), the slurry is esterified at a temperature of from about 165 to about 300° C.

20. The process of claim 1 wherein step (c), the slurry is esterified at a pressure of atmospheric to about 60 psig (5.25 km/cm$^2$).

21. The process of claim 1 wherein the process is continuous.

22. The process of claim 1 further comprising the step of:
   f) prior to step (e), transesterifying with an ester derivative of a second diacid at sufficient temperatures and pressures in the presence of a suitable catalyst to effect transesterification.

23. The process of claim 22 wherein step f), the transesterification catalyst is titanium present from about 5 to about 150 ppm.

24. The process of claim 22 wherein step f), the transesterifying occurs before step c).

25. The process of claim 22 wherein step f), the transesterifying occurs during step c).

26. The process of claim 22 wherein step f), the transesterifying occurs after step c).

27. The process of claim 22 wherein the process is continuous.

28. In a process for producing a polyester comprising repeat units of residues of CHDM and a dicarboxylic acid by esterification and/or transesterification followed by polycondensation, the improvement comprising the steps of:

a) preparing an aqueous or a methanolic slurry comprising CHDM and a dicarboxylic acid, the slurry being maintained at a temperature below the melting point of CHDM and b) feeding the slurry to a reactor at sufficient temperatures and pressures, and optionally in the presence of a suitable catalyst, to produce a polyester.

29. The process of claim 28 wherein step a), the slurry is prepared with about 2 to about 15 weight percent water.

30. The process of claim 29 wherein step a), the slurry is prepared with about 2 to about 6 weight percent water.

31. The process of claim 28 wherein the slurry is maintained at a temperature from below 55° C. to ambient conditions.

32. The process of claim 28 wherein the slurry is maintained at ambient conditions.

33. The process of claim 28 wherein step a), the dicarboxylic acid is selected from the group consisting of isophthalic acid, terephthalic acid, naphthalenedicarboxylic acid, 1,4-cyclohexanedicarboxylic acid, 5-sodiosulfoisophthalic acid, adipic acid, and mixtures thereof.

34. The process of claim 28 wherein step a), the slurry is prepared with the dicarboxylic acid being isophthalic acid.

35. The process of claim 28 wherein step a), the slurry is prepared with the dicarboxylic acid being terephthalic acid.

* * * * *